(12) United States Patent
Iguchi

(10) Patent No.: US 11,175,576 B2
(45) Date of Patent: Nov. 16, 2021

(54) METHOD OF OPERATION OF PROJECTOR AND PROJECTOR

(71) Applicant: SEIKO EPSON CORPORATION, Tokyo (JP)

(72) Inventor: Tatsuya Iguchi, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/131,950

(22) Filed: Dec. 23, 2020

(65) Prior Publication Data

US 2021/0200076 A1 Jul. 1, 2021

(30) Foreign Application Priority Data

Dec. 26, 2019 (JP) .............................. JP2019-235888

(51) Int. Cl.
*H04N 9/31* (2006.01)
*G03B 21/20* (2006.01)

(52) U.S. Cl.
CPC ....... *G03B 21/2053* (2013.01); *H04N 9/3155* (2013.01); *H04N 9/3161* (2013.01); *H04N 9/3182* (2013.01)

(58) Field of Classification Search
CPC .. H04N 9/3155; H04N 9/3182; H04N 9/3161; H04N 9/3164; H04N 9/31; H04N 9/3105; H04N 9/3167; G03B 21/2053; G03B 21/2033; G03B 21/2013
USPC .... 348/744, 750, 756, 757, 774; 353/30, 31, 353/81, 94
See application file for complete search history.

(56) References Cited

U.S. PATENT DOCUMENTS

| | | | |
|---|---|---|---|
| 2006/0192899 A1 | 8/2006 | Ogita | |
| 2013/0044297 A1* | 2/2013 | Horiguchi | H04N 9/3155 353/85 |
| 2015/0215592 A1 | 7/2015 | Tone et al. | |
| 2017/0208308 A1 | 7/2017 | Iguchi et al. | |

FOREIGN PATENT DOCUMENTS

| | | |
|---|---|---|
| JP | 2006-267995 A | 10/2006 |
| JP | 2008-102305 A | 5/2008 |
| JP | 2008-216560 A | 9/2008 |
| JP | 2015-158659 A | 9/2015 |
| JP | 2017-129658 A | 7/2017 |

* cited by examiner

*Primary Examiner* — Sherrie Hsia
(74) *Attorney, Agent, or Firm* — Oliff PLC

(57) ABSTRACT

A method of an operation of a projector, projector including first, second, and third light provider configured to output a first, second, and third light having first color, first generator configured to generate first output light from first light, second generator configured to generate second output light from second light, third generator configured to generate third output light from third light, and projection optical system configured to project projection image using first, second, and third output light, method includes, based on image information representing first image, amplification information representing degree of amplification of brightness of first image, and controlling, based on amplification information, proportion of light intensity of second output light to light intensity of second light received by second generator, and proportion of light intensity of third output light to light intensity of third light received by third generator.

13 Claims, 12 Drawing Sheets

FIG. 19

| PIXEL VALUE | | | NUMBER OF PIXELS |
|---:|:---:|---:|---:|
| 0 | – | 9 | 0 |
| 10 | – | 19 | 10 |
| 20 | – | 29 | 30 |
| 30 | – | 39 | 90 |
| 40 | – | 49 | 150 |
| 50 | – | 59 | 250 |
| 60 | – | 69 | 150 |
| 70 | – | 79 | 60 |
| 80 | – | 89 | 70 |
| 90 | – | 99 | 80 |
| 100 | – | 109 | 50 |
| 110 | – | 119 | 55 |
| 120 | – | 129 | 0 |
| 130 | – | 139 | 0 |
| 140 | – | 149 | 0 |
| 150 | – | 159 | 0 |
| 160 | – | 169 | 0 |
| 170 | – | 179 | 0 |
| 180 | – | 189 | 0 |
| 190 | – | 199 | 0 |
| 200 | – | 209 | 0 |
| 210 | – | 219 | 0 |
| 220 | – | 229 | 0 |
| 230 | – | 239 | 0 |
| 240 | – | 249 | 2 |
| 250 | – | 255 | 3 |

METHOD OF OPERATION OF PROJECTOR AND PROJECTOR

The present application is based on, and claims priority from JP Application Serial Number 2019-235888, filed Dec. 26, 2019, the disclosure of which is hereby incorporated by reference herein in its entirety.

BACKGROUND

1. Technical Field

The present disclosure relates to a method of an operation of a projector and a projector.

2. Related Art

In JP-A-2015-158659, there is described a projector including a light source device for outputting yellow light generated from red light and green light, and a light source device for outputting blue light. This projector separates the yellow light into the red light and the green light, and generates an image using the red light, the green light, and the blue light.

In the projector described in JP-A-2015-158659, there is assumed when either one of the output of the yellow light and the output of the blue light is decreased in order to adjust the white balance of the image. In this case, there occurs available capacity in either one of the light source device for outputting the yellow light and the light source device for outputting the blue light. It should be noted that a situation in which the available capacity occurs in the projector can also occur in a projector different in configuration from the projector described in JP-A-2015-158659, such as a projector including a light source device for outputting the red light, a light source device for outputting the green light, and a light source device for outputting the blue light. Further, the available capacity occurring in the projector is not limited to the available capacity of light source devices. Therefore, a technology capable of taking advantage of the available capacity occurring in the projector is desired.

SUMMARY

A method of an operation of a projector according to an aspect of the present disclosure is a method of an operation of a projector including a first light provider configured to output first light having a first color, a second light provider configured to output second light having a second color, a third light provider configured to output third light having a third color, a first generator configured to generate first output light from first colored light received out of the first light, a second generator configured to generate second output light from second colored light received out of the second light, a third generator configured to generate third output light from third colored light received out of the third light, and a projection optical system configured to use the first output light, the second output light, and the third output light to thereby project a projection image, including the steps of deciding, based on image information representing a first image, amplification information representing a degree of amplification of brightness of the first image, and controlling, based on the amplification information, light intensity of the first light, a proportion of light intensity of the second output light to light intensity of the second colored light, and a proportion of light intensity of the third output light to light intensity of the third colored light.

A method of an operation of a projector according to another aspect of the present disclosure is a method of an operation of a projector including a first light provider configured to output first light having a first color, a second light provider configured to output second light having a second color, a third light provider configured to output third light having a third color, a first generator configured to generate first output light from first colored light received out of the first light, a second generator configured to generate second output light from second colored light received out of the second light, a third generator configured to generate third output light from third colored light received out of the third light, and a projection optical system configured to use the first output light, the second output light, and the third output light to thereby project a projection image, including the steps of deciding, based on image information representing a first image, amplification information representing a degree of amplification of brightness of the first image, and controlling, based on the amplification information, a proportion of light intensity of the first output light to light intensity of the first colored light, a proportion of light intensity of the second output light to light intensity of the second colored light, and a proportion of light intensity of the third output light to light intensity of the third colored light.

A projector according to another aspect of the present disclosure includes a first light provider configured to output first light having a first color, a second light provider configured to output second light having a second color, a third light provider configured to output third light having a third color, a first generator configured to generate first output light from first colored light received out of the first light, a second generator configured to generate second output light from second colored light received out of the second light, a third generator configured to generate third output light from third colored light received out of the third light, a projection optical system configured to use the first output light, the second output light, and the third output light to thereby project a projection image, a decider configured to decide, based on image information representing a first image, amplification information representing a degree of amplification of brightness of the first image, and a light controller configured to control, based on the amplification information, light intensity of the first light, a proportion of light intensity of the second output light to light intensity of the second colored light, and a proportion of light intensity of the third output light to light intensity of the third colored light.

A projector according to another aspect of the present disclosure includes a first light provider configured to output first light having a first color, a second light provider configured to output second light having a second color, a third light provider configured to output third light having a third color, a first generator configured to generate first output light from first colored light received out of the first light, a second generator configured to generate second output light from second colored light received out of the second light, a third generator configured to generate third output light from third colored light received out of the third light, a projection optical system configured to use the first output light, the second output light, and the third output light to thereby project a projection image, a decider configured to decide, based on image information representing a first image, amplification information representing a degree of amplification of brightness of the first image, and a light controller configured to control, based on the amplification information, a proportion of light intensity of the first output light to light intensity of the first colored light, a proportion of light intensity of the second output light to light intensity of the second colored light, and a proportion of light intensity of the third output light to light intensity of the third colored light.

BRIEF DESCRIPTION OF THE DRAWINGS

FIG. 19 is a diagram showing an example of a frequency distribution.

DESCRIPTION OF AN EXEMPLARY EMBODIMENT

A: First Embodiment

A1: Projector 1000

Figure 1:
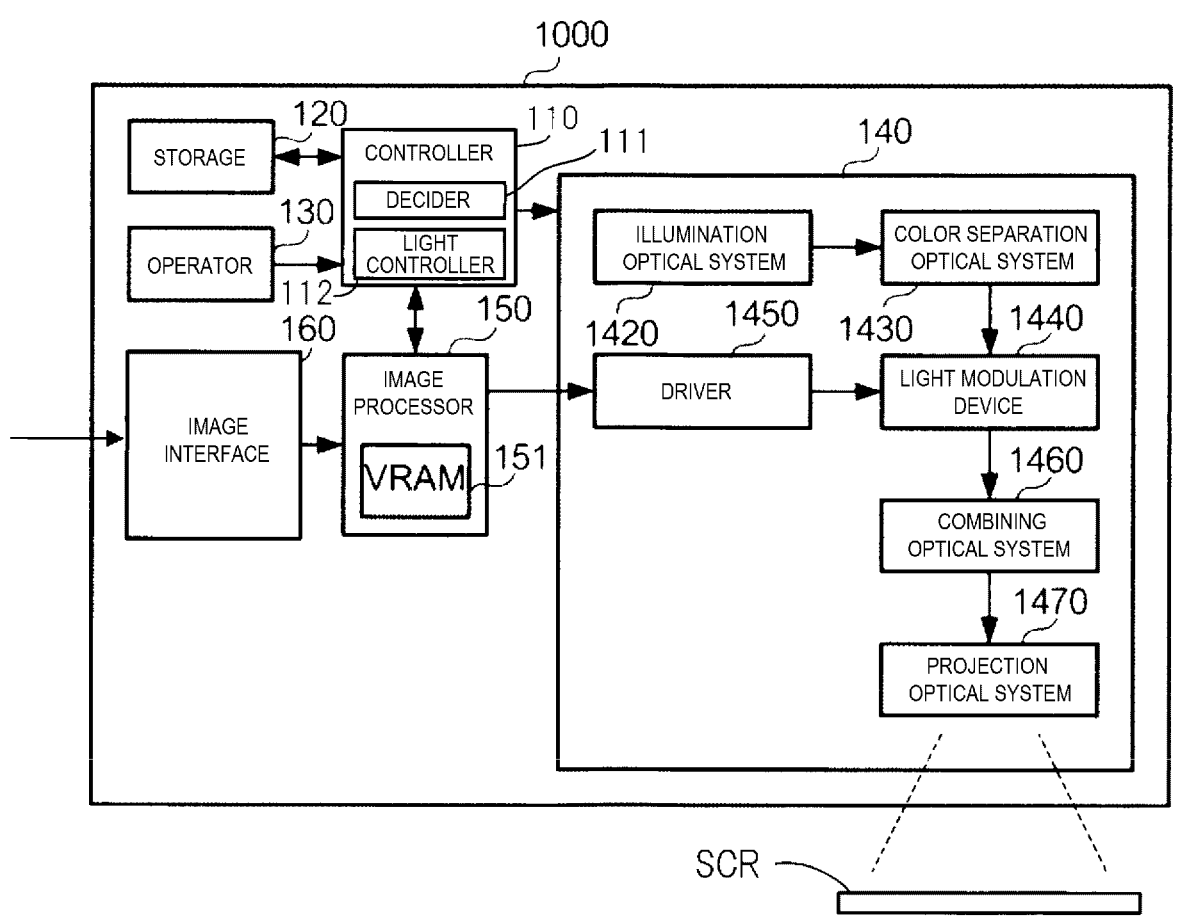
FIG. 1 is a diagram showing a projector 1000 according to a first embodiment.

FIG. 1 is a diagram showing a projector 1000 according to the first embodiment. The projector 1000 receives image information from an image supply device not shown. The image supply device is, for example, a PC (Personal Computer). The image supply device is not limited to the PC, but can also be, for example, a tablet terminal, a smartphone, a video reproduction device, a DVD (Digital Versatile Disc) player, a Blu-ray disc player, a hard disk recorder, a television tuner device, or a video game device.

The projector 1000 projects a projection image based on the image information to a display surface SCR. The display surface SCR is, for example, a screen. The display surface SCR is not limited to the screen, but can also be, for example, a whiteboard, a wall, a ceiling, a floor, or a door. The image information represents an image. The image represented by the image information is an example of a first image. The image information includes a plurality of red pixel values, a plurality of green pixel values, and a plurality of blue pixel values. The plurality of red pixel values represents an image of a red color. The plurality of green pixel values represents an image of a green color. The plurality of blue pixel values represents an image of a blue color. The red color is an example of a second color. The green color is an example of a third color. The blue color is an example of a first color.

The projector 1000 includes a controller 110, a storage 120, an operator 130, a projector 140, an image processor 150, and an image interface 160.

The operator 130 corresponds to, for example, operation buttons, operation keys, or a touch panel. The operator 130 is provided to a chassis of the projector 1000. The operator 130 receives an input operation by the user. The operator 130 can be provided with a light receiver for receiving an infrared signal transmitted by a remote controller not shown. The remote controller includes operation buttons, operation keys, or a touch panel. The remote controller receives an input operation by the user. The remote controller transmits the infrared signal based on the input operation.

The image interface 160 has a plurality of connectors. Each of the connectors is capable of receiving the image information from the image supply device. The plurality of connectors corresponds to an RCA connector, a D-sub connector, an HDMI (High Definition Multimedia Interface) connector, and a USB (Universal Serial Bus) connector. HDMI is a registered trademark. The plurality of connectors is not limited to these connectors. It is possible for the image interface 160 to have just one connector. It is also possible for the image interface 160 to have a wireless communication interface such as wireless LAN (Local Area Network) or Bluetooth. In this case, the image interface 160 can obtain the image information via the wireless communication interface. Bluetooth is a registered trademark. The image interface 160 supplies the image information to the image processor 150.

The image processor 150 is formed of a circuit such as a single image processor or a plurality of image processors. The image processor 150 receives the image information from the image interface 160. The image information which the image processor 150 receives from the image interface 160 is hereinafter referred to as "projection image information." The image processor 150 receives on-screen image information representing an on-screen image from the controller 110. The on-screen image represents, for example, a GUI (Graphical User Interface) for operating the projector 1000. The image processor 150 includes a VRAM (Video Random Access Memory) 151. The VRAM 151 includes an area where the projection image information is developed, and an area where the on-screen image information is developed.

The image processor 150 executes image processing. An example of the image processing is an image quality adjustment process of adjusting the image quality. The image processing is not limited to the image quality adjustment process. The image processing can be a so-called gamma correction process. The image processor 150 performs the image processing on the projection image information having been developed on the VRAM 151 to thereby generate a drive signal. When the image processor 150 receives the on-screen image information, the image processor 150 superimposes the on-screen image information on the projection image information to thereby generate superimposed image information. The image processor 150 performs the image processing on the superimposed image information to thereby generate the drive signal. The image processor 150 supplies the drive signal to the projector 140.

The projector 140 receives the drive signal from the image processor 150. The projector 140 is controlled by the controller 110. The projector 140 projects the image based on the drive signal to the display surface SCR under the control by the controller 110. The projector 140 includes an illumination optical system 1420, a color separation optical system 1430, a light modulation device 1440, a driver 1450, a combining optical system 1460, and a projection optical system 1470.

The illumination optical system 1420 emits illumination light WL having a white color. The color separation optical system 1430 separates the illumination light WL into the red light beam LR, the green light beam LG, and the blue light beam LB. The driver 1450 is formed of a circuit such as a driver. The driver 1450 generates drive voltages based on the drive signal supplied from the image processor 150. The driver 1450 supplies the drive voltages to the light modulation device 1440 to thereby drive the light modulation device 1440. The light modulation device 1440 modulates each of the red light LR, the green light LG, and the blue light LB based on the drive voltages. The light modulation device 1440 modulates the red light LR to thereby generate red image light. The light modulation device 1440 modulates the green light LG to thereby generate green image light. The light modulation device 1440 modulates the blue light LB to thereby generate blue image light. The combining optical system 1460 combines the red image light, the green image light, and the blue image light with each other to generate the projection image light. The projection optical system 1470 projects the projection image represented by the projection image light toward the display surface SCR.

The storage 120 is a recording medium which can be read by the controller 110. The storage 120 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM (Random Access Memory). The storage 120 stores a program to be executed by the controller 110, and a variety of types of data to be used by the controller 110.

The controller 110 is formed of, for example, a single processor or a plurality of processors. Citing an example, the controller 110 is formed of a signal CPU (Central Processing Unit) or a plurality of CPUs. Some or all of the functions of the controller 110 can also be realized by a circuit such as a DSP (Digital Signal Processor), an ASIC (Application Specific Integrated Circuit), a PLD (Programmable Logic Device), or an FPGA (Field Programmable Gate Array). The controller 110 executes a variety of types of processing in parallel or in sequence. The controller 110 reads a program from the storage 120. The controller 110 executes the program to thereby realize a decider 111 and a light controller 112.

The decider 111 receives the image information such as the projection image information from the image processor 150. The decider 111 analyzes the image information. The decider 111 can be formed of a circuit such as a decision circuit. The light controller 112 controls the projector 140 and the image processor 150 based on the analysis result of the image information. The light controller 112 can be formed of a circuit such as a light controller.

A2: Example of Illumination Optical System 1420

Figure 2:
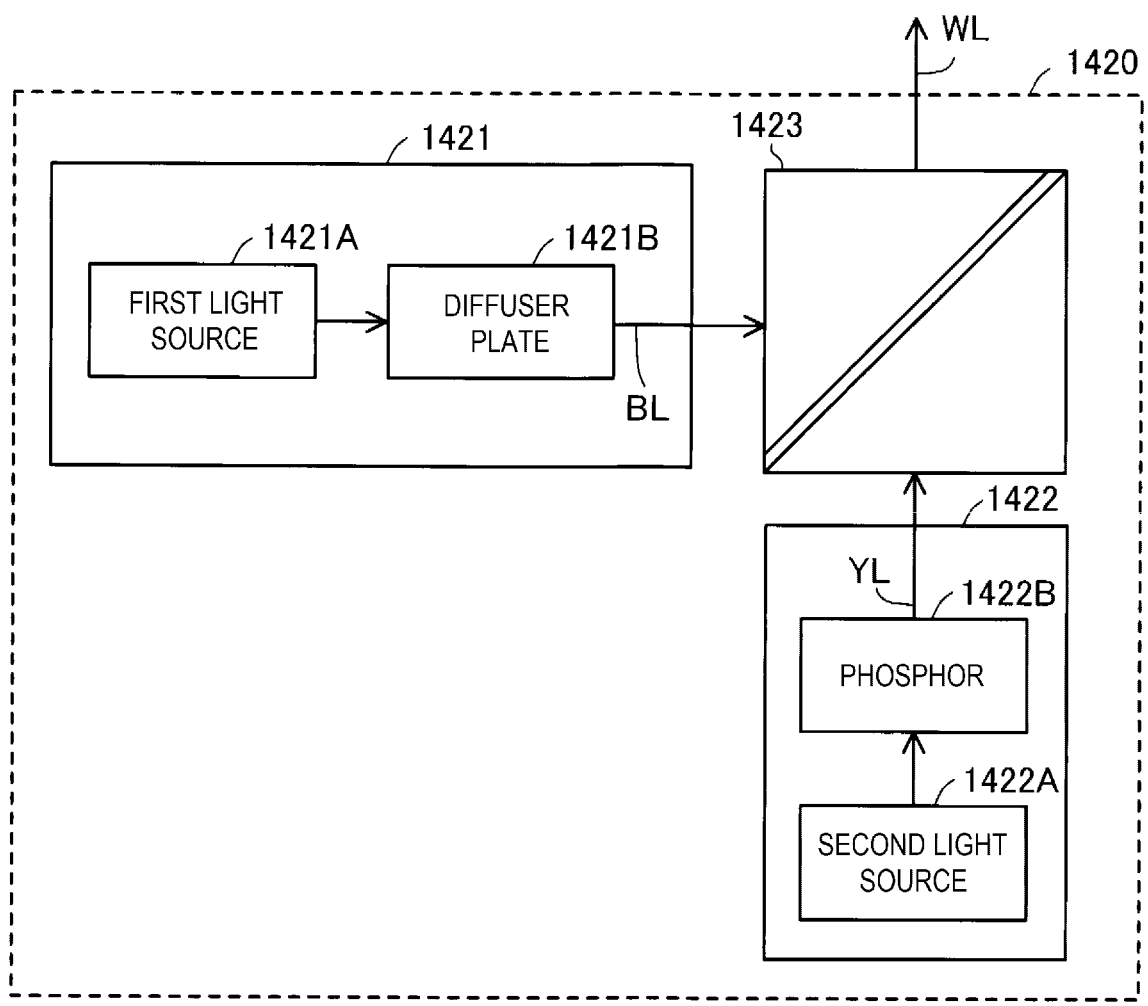
FIG. 2 is a diagram showing an example of an illumination optical system 1420.

FIG. 2 is a diagram showing an example of the illumination optical system 1420. The illumination optical system 1420 includes a blue light provider 1421, a yellow light provider 1422, and a combiner 1423.

The blue light provider 1421 outputs the blue light BL to the combiner 1423. The blue light BL is an example of first light. The blue light provider 1421 is an example of a first light provider. The blue light provider 1421 includes a first light source 1421A and a diffuser plate 1421B. The first light source 1421A is a laser. The first light source 1421A emits a first blue laser beam to the diffuser plate 1421B. The diffuser plate 1421B diffuses the first blue laser beam to thereby generate the blue light BL. The diffuser plate 1421B emits the blue light BL to the combiner 1423.

The yellow light provider 1422 outputs fluorescence YL having a yellow color to the combiner 1423. The fluorescence YL consists of red light and green light. Therefore, the fact that the yellow light provider 1422 outputs the fluorescence YL means the fact that the yellow light provider 1422 outputs the red light and the green light. The red light is an example of second light. The green light is an example of third light. The yellow light provider 1422 is an example of a second light provider, a third light provider, a red light provider, and a green light provider. The yellow light provider 1422 includes a second light source 1422A and a phosphor 1422B. The second light source 1422A is a laser. The second light source 1422A emits a second blue laser beam toward the phosphor 1422B. The phosphor 1422B is excited in accordance with incident of the second blue laser beam. The phosphor 1422B is excited to thereby generate the fluorescence YL. The phosphor 1422B emits the fluorescence YL to the combiner 1423.

The combiner 1423 includes a dichroic prism. It is possible for the combiner 1423 to include a dichroic mirror instead of the dichroic prism. The combiner 1423 combines the blue light BL with the fluorescence YL to thereby generate the illumination light WL having a white color. The combiner 1423 reflects the blue light BL and at the same time transmits the fluorescence YL to thereby generate the illumination light WL.

A3: Example of Each of Color Separation Optical System 1430, Light Modulation Device 1440, and Combining Optical System 1460

Figure 3:
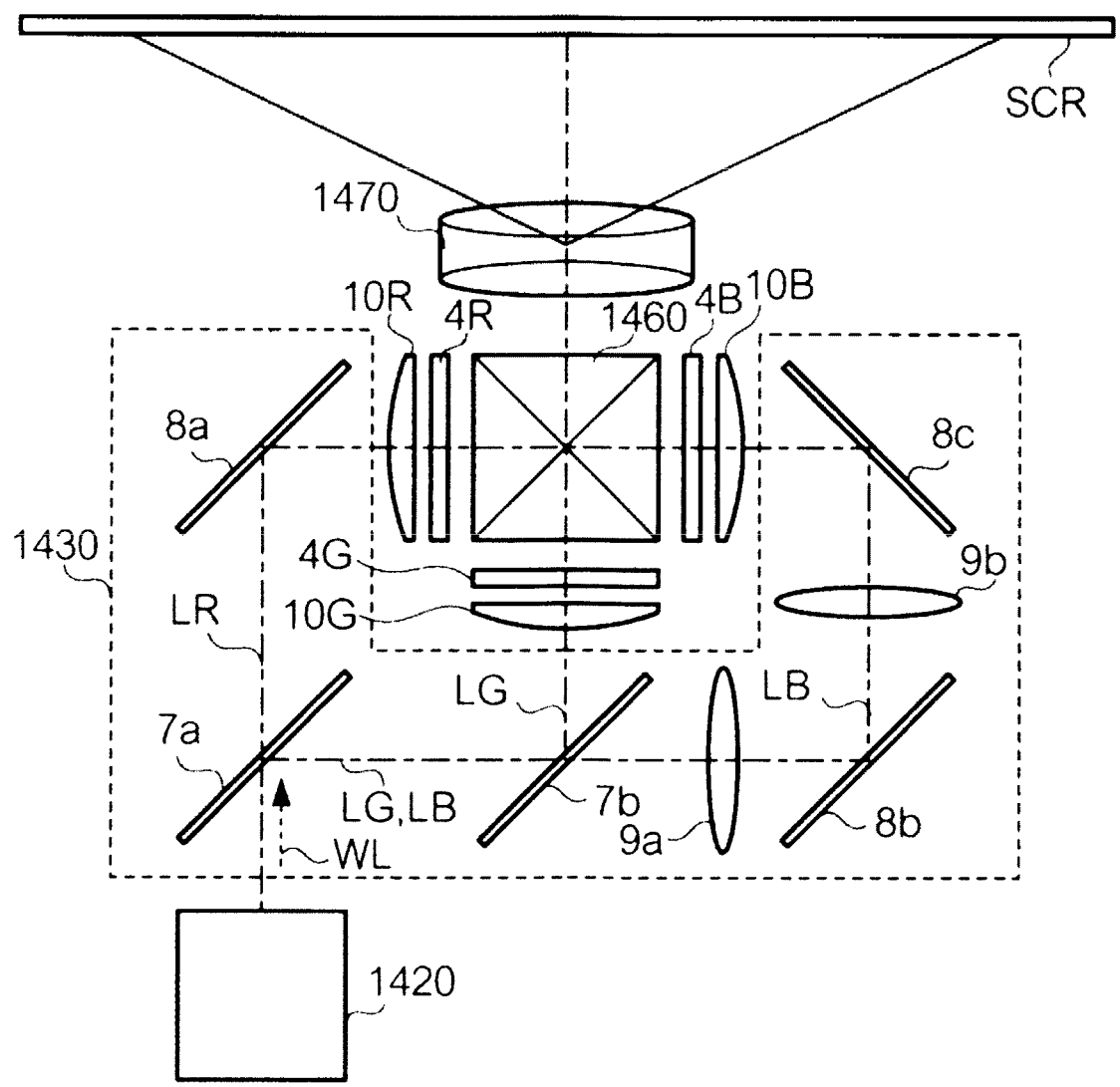
FIG. 3 is a diagram showing an example of each of a color separation optical system 1430, a light modulation device 1440, and a combining optical system 1460.

FIG. 3 is a diagram showing an example of each of the color separation optical system 1430, the light modulation device 1440, and the combining optical system 1460. The color separation optical system 1430 includes a first dichroic mirror 7a, a second dichroic mirror 7b, a first reflecting mirror 8a, a second reflecting mirror 8b, a third reflecting mirror 8c, a first relay lens 9a, and a second relay lens 9b. The light modulation device 1440 includes a red light modulation device 4R, a green light modulation device 4G, and a blue light modulation device 4B.

The first dichroic mirror 7a separates the illumination light WL into the red light LR and light different in color from the red light LR. The light different in color from the red light LR corresponds to the green light LG and the blue light LB. The first dichroic mirror 7a transmits the red light LR, and reflects the green light LG and the blue light LB. The second dichroic mirror 7b separates the light having been reflected by the first dichroic mirror 7a into the green light LG and the blue light LB. The second dichroic mirror 7b reflects the green light LG and transmits the blue light LB.

The first reflecting mirror 8a is disposed in the light path of the red light LR. The first reflecting mirror 8a reflects the red light LR toward the red light modulation device 4R. The second reflecting mirror 8b and the third reflecting mirror 8c are disposed in the light path of the blue light LB. The second reflecting mirror 8b reflects the blue light LB toward the third reflecting mirror 8c. The third reflecting mirror 8c reflects the blue light LB toward the blue light modulation device 4B. The green light LG is reflected by the second dichroic mirror 7b, and then proceeds toward the green light modulation device 4G.

The first relay lens 9a is disposed between the second dichroic mirror 7b and the second reflecting mirror 8b. The second relay lens 9b is disposed between the second reflecting mirror 8b and the third reflecting mirror 8c. The first relay lens 9a and the second relay lens 9b compensate the light loss of the blue light LB. The light loss of the blue light LB is caused by the fact that the optical path length of the blue light LB is longer than the optical path length of the red light LR and the optical path length of the green light LG.

The red light modulation device 4R, the green light modulation device 4G, and the blue light modulation device 4B are each a transmissive liquid crystal panel. The liquid crystal panel is disposed between a pair of polarization plates not shown. The pair of polarization plates transmit linearly-polarized light of a specific direction.

The red light modulation device 4R receives the red light LR. The red light modulation device 4R generates the red image light from the red light LR. The red light modulation device 4R includes a plurality of pixels. The plurality of pixels included in the red light modulation device 4R is hereinafter referred to as a "plurality of red pixels." The plurality of red pixels generates second output light from the red light (also referred to as second colored light) received out of the red light LR. The red image light consists of the second output light generated by the respective red pixels. The red light modulation device 4R is an example of a second generator.

The green light modulation device 4G receives the green light LG. The green light modulation device 4G generates the green image light from the green light LG. The green light modulation device 4G includes a plurality of pixels. The plurality of pixels included in the green light modulation device 4G is hereinafter referred to as a "plurality of green pixels." The plurality of green pixels generates third output light from the green light (also referred to as third colored light) received out of the green light LG. The green image light consists of the third output light generated by the respective green pixels. The green light modulation device 4G is an example of a third generator.

The blue light modulation device 4B receives the blue light LB. The blue light modulation device 4B generates the blue image light from the blue light LB. The blue light modulation device 4B includes a plurality of pixels. The plurality of pixels included in the blue light modulation device 4B is hereinafter referred to as a "plurality of blue pixels." The plurality of blue pixels generates first output light from the blue light (also referred to as first colored light) received out of the blue light LB. The blue image light consists of the first output light generated by the respective blue pixels. The blue light modulation device 4B is an example of a first generator.

Between the red light modulation device 4R and the first reflecting mirror 8a, there is disposed a first field lens 10R. The first field lens 10R collimates the red light LR. Between the green light modulation device 4G and the second dichroic mirror 7b, there is disposed a second field lens 10G. The second field lens 10G collimates the green light LG. Between the blue light modulation device 4B and the third reflecting mirror 8c, there is disposed a third field lens 10B. The third field lens 10B collimates the blue light LB.

The combining optical system 1460 includes, for example, a cross dichroic prism. The combining optical system 1460 combines the red image light, the green image light, and the blue image light with each other to generate the projection image light. The combining optical system 1460 emits the projection image light to the projection optical system 1470.

The projection optical system 1470 is formed of a projection lens group including a plurality of projection lenses. The projection optical system 1470 projects the projection image represented by the projection image light to the display surface SCR to thereby display the projection image in the display surface SCR.

A4: Operation Characteristics of Blue Light Provider 1421 and Yellow Light Provider 1422

The blue light provider 1421 and the yellow light provider 1422, specifically the first light source 1421A and the second light source 1422A, are each driven by a supply current. Due to an increase in the supply current I1 supplied to the first light source 1421A, the blue light provider 1421 increases the light intensity of the blue light BL. Due to an increase in the supply current I2 supplied to the second light source 1422A, the yellow light provider 1422 increases the light intensity of the fluorescence, namely the light intensity of the red light LR and the light intensity of the green light LG.

A5: Outline of Operation

In the projector 1000, in order to adjust the white balance in the projection image, the supply current I1 to be supplied to the blue light provider 1421 and the supply current to be supplied to the yellow light provider 1422 are adjusted.

Figure 4:
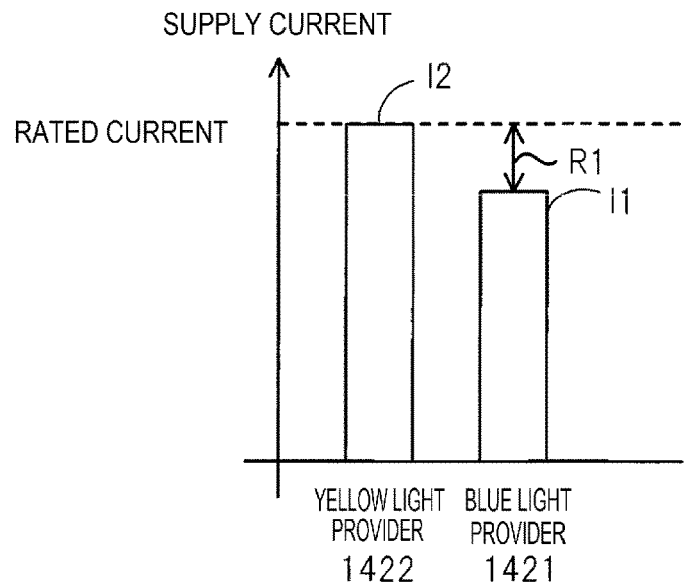
FIG. 4 is a diagram showing a relationship between supply currents I1, I2.

FIG. 4 is a diagram showing a relationship between the supply currents I1, I2 when the projection image is a white image the highest in luminance. As illustrated in FIG. 4, the supply current I2 is equal to a rated current. In contrast, the supply current I1 is lower than the rated current. It should be noted that although FIG. 4 shows an example in which the rated current for the blue light provider 1421 is equal to the rated current for the yellow light provider 1422, it is also possible for the rated current for the blue light provider 1421 to be different from the rated current for the yellow light provider 1422. In such a case, in the related-art projector, the supply current I2 is fixed to the rated current, and the supply current I1 is fixed to a current lower than the rated current shown in FIG. 4. Therefore, although no available capacity occurs in the yellow light provider 1422, there occurs available capacity based on an allowance current R1 in the blue light provider 1421. The projector 1000 uses at least a part of the available capacity of the blue light provider 1421 in order to make the projection image brighter taking the white balance in the projection image into consideration.

In order to keep the white balance in the projection image, it is necessary to keep the balance between the light intensity of the red image light included in the projection image light, the light intensity of the green image light included in the projection image light, and the light intensity of the blue image light included in the projection image light. The light intensity of the red image light included in the projection image light depends on the output of the yellow light provider 1422 and the transmittance of the red light modulation device 4R. The light intensity of the green image light included in the projection image light depends on the output of the yellow light provider 1422 and the transmittance of the green light modulation device 4G. The light intensity of the blue image light included in the projection image light depends on the output of the blue light provider 1421 and the transmittance of the green light modulation device 4B. When there is a possibility that available capacity exists in the transmittance of each of the red light modulation device 4R and the green light modulation device 4G, namely when there is a possibility that both of the transmittance of the red light modulation device 4R and the transmittance of the green light modulation device 4G are lower than respective upper limit values, the light controller 112 increases both of the transmittance of the red light modulation device 4R and the transmittance of the green light modulation device 4G, and at the same time, increases the output of the blue light provider 1421.

A6: Example of Operation

In order to simplify the description, the maximum transmittance of each of the red light modulation device 4R, the green light modulation device 4G, and the blue light modulation device 4B is assumed as 100%. It should be noted that the maximum transmittance does not reach 100% in reality. Therefore, the maximum transmittance of 100% is realized by, for example, normalizing the actual maximum transmittance into the maximum transmittance of 100%.

The output of the blue light provider 1421 when the supply current I1 to the blue light provider 1421 is the current shown in FIG. 4 is defined as 100%. The output of the yellow light provider 1422 when the supply current I2 to the yellow light provider 1422 is the rated current shown in FIG. 4 is defined as 100%. As described above, the image information represents the plurality of red pixel values, the plurality of green pixel values, and the plurality of blue pixel values. Each of the pixel values represents a value within a range of "0" through "255." It should be noted that it is possible for each of the pixel values to represent a value within a range different from the range of "0" through "255." Due to an increase in the pixel value, the luminance of the pixel corresponding to the pixel value increases. Specifically, due to the increase in the pixel value, the transmittance of the pixel corresponding to the pixel value increases. The transmittance of the pixel of the red light modulation device 4R is hereinafter referred to as "red transmittance." The transmittance of the pixel of the green light modulation device 4G is hereinafter referred to as "green transmittance." The transmittance of the pixel of the blue light modulation device 4B is hereinafter referred to as "blue transmittance." The red transmittance is an example of the proportion of the light intensity of the second output light to the light intensity of the second colored light. The green transmittance is an example of the proportion of the light intensity of the third output light to the light intensity of the third colored light. The blue transmittance is an example of the proportion of the light intensity of the first output light to the light intensity of the first colored light.

First, there is presented an example of increasing both of the red transmittance and the green transmittance, and at the same time, increasing the output of the blue light provider 1421 when one frame of image represented by the image information is in a first situation. The first situation is as follows. The maximum value in the plurality of red pixel values is "217." The maximum value in the plurality of green pixel values is "217." The maximum value in the plurality of blue pixel values is "255."

In this case, the decider 111 identifies "70%" as the maximum value of the red transmittance based on the maximum value "217" of the red pixel values. The decider 111 identifies "70%" as the maximum value of the green transmittance based on the maximum value "217" of the green pixel values. The decider 111 identifies "100%" as the maximum value of the blue transmittance based on the maximum value "255" of the blue pixel values. The maximum value of 70% of the red transmittance is an example of a second value. The maximum value of 70% of the green transmittance is an example of a third value. The maximum value of 100% of the blue transmittance is an example of a first value. It should be noted that the decider 111 identifies the transmittance based on the pixel value using the information representing the relationship between the pixel value and the transmittance such as a function representing the relationship between the pixel value and the transmittance or a table representing the relationship between the pixel value and the transmittance.

The decider 111 decides an increase ratio as a ratio in brightness of the projection image to the image represented by the image information based on the image information, specifically, based on the maximum value of the red transmittance, the maximum value of the green transmittance, and the maximum value of the blue transmittance. The increase ratio is an example of amplification information. The amplification information represents a degree of amplification of the brightness in the image represented by the image information. The increase ratio is also an example of a gain. A specific method of deciding the increase ratio will be described later. Here, it is assumed that the decider 111 decides "1.1" as the increase ratio.

The light controller 112 controls the light intensity of the blue light BL emitted by the blue light provider 1421, the proportion of the light intensity of the second output light to the light intensity of the second colored light in the red light modulation device 4R, and the proportion of the light intensity of the third output light to the light intensity of the third colored light in the green light modulation device 4G based on the increase ratio.

The output of the yellow light provider 1422 is kept in 100%. The light controller 112 changes the output of the blue light provider 1421 to 100%*1.1=110%. The value "1.1" is the value of the increase ratio. The light controller 112 makes the supply current I1 shown in FIG. 4 higher than the current shown in FIG. 4 to thereby change the output of the blue light provider 1421 to 110%. The light controller 112 makes the transmittance of each of the pixels of the red light modulation device 4R 1.1 times as high as before. For example, the light controller 112 changes the maximum value of 70% of the red transmittance to 70%*1.1=77%. The value "1.1" is the value of the increase ratio. The light controller 112 makes the transmittance of each of the pixels of the green light modulation device 4G 1.1 times as high as before. For example, the light controller 112 changes the maximum value of 70% of the green transmittance to 70%*1.1=77%. The value "1.1" is the value of the increase ratio. The light controller 112 does not change the transmittance of each of the pixels of the blue light modulation device 4B. For example, the light controller 112 keeps the maximum value of 100% of the blue transmittance.

Since the transmittance of each of the pixels of the red light modulation device 4R is made 1.1 times as high as before, the light intensity of the red image light included in the projection image light becomes 1.1 times as high as before. Since the transmittance of each of the pixels of the green light modulation device 4G is made 1.1 times as high as before, the light intensity of the green image light included in the projection image light becomes 1.1 times as high as before. Since the output of the blue light provider 1421 is made 1.1 times as high as before, the light intensity of the blue image light included in the projection image light becomes 1.1 times as high as before. Therefore, it is possible to increase the brightness of the projection image light while keeping the white balance.

The light controller 112 corrects each of the red pixel values in order to change the transmittance of each of the pixels of the red light modulation device 4R. When the relationship between the red transmittance and the red pixel values can be expressed by the following gamma compensation formula using γ, the light controller 112 calculates the corrected red pixel values using the gamma compensation formula.

(red transmittance)=((red pixel value)/255)$^\gamma$

Denoting the target increase ratio by "a," the uncorrected red transmittance by "t," the uncorrected red pixel value by "g," and the corrected red pixel value by "g'," the following two formulas are realized.

$T=(g/255)^\gamma$ $T*a=(g'/255)^\gamma$

When substituting the upper formula into the lower formula, the following formula is realized.

$((g/255)^\gamma)*a=(g'/255)^\gamma$ $g'=a^{(1/\gamma)}*g$

Therefore, it is possible for the light controller 112 to calculate the corrected red pixel value "g'" based on the target increase ratio "a" and the uncorrected red pixel value "g."

When setting γ=2.2 in the first situation, the corrected red pixel value "g'" becomes as follows.

$g'=1.1^{(1/2.2)}*217=227$

Therefore, it is possible for the light controller 112 to set the red transmittance as 77% by converting the uncorrected red pixel value of "217" into the corrected red pixel value of "227." Regarding the green pixel values, the light controller 112 also calculates the corrected green pixel values similarly to the red pixel values.

Then, a method of deciding the increase ratio will be described.

As described above, in the situation in which the blue light provider 1421 has the available capacity, it is possible to make the increase ratio higher than "1" while keeping the white balance in the projection image when it is possible to increase both of the maximum value of the red transmittance and the maximum value of the green transmittance, namely when both of the maximum value of the red transmittance and the maximum value of the green transmittance are lower than the respective upper limit values. In other words, whether or not the increase ratio can be made higher than "1" depends on the image information for identifying the maximum value of the red transmittance and the maximum value of the green transmittance such as the projection image information. Citing an example, when the maximum value of the red pixel values and the maximum value of the green pixel values are equal to the upper limit value of "255," the maximum value of the red transmittance and the maximum value of the green transmittance cannot be increased. Therefore, in this case, it is unachievable to make the projection image brighter while keeping the white balance in the projection image.

First, the decider 111 identifies the plurality of red pixel values, the plurality of green pixel values, and the plurality of blue pixel values from the image information corresponding one frame. Subsequently, the decider 111 identifies the maximum value Rmax of the red transmittance based on the maximum value of the plurality of red pixel values. Subsequently, the decider 111 identifies the maximum value Gmax of the green transmittance based on the maximum value of the plurality of green pixel values. Subsequently, the decider 111 identifies the maximum value Bmax of the blue transmittance based on the maximum value of the plurality of blue pixel values. It should be noted that the decider 111 calculates the transmittance from the pixel value using the gamma compensation formula described above.

Subsequently, the decider 111 decides higher one of the maximum value Rmax of the red transmittance and the maximum value Gmax of the green transmittance as the maximum value Ymax of red-green transmittance.

Figure 5:
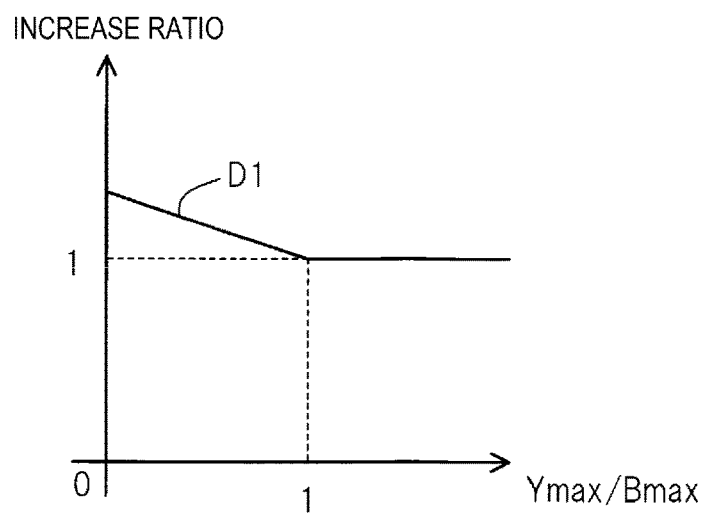
FIG. 5 is a diagram showing an example of a function taking Ymax/Bmax as an independent variable, and taking an increase ratio D1 as a dependent variable.

Subsequently, the decider 111 decides the increase ratio based on a value of Ymax/Bmax. Citing an example, the decider 111 uses a function taking Ymax/Bmax as an independent variable, and taking the increase ratio as a dependent variable to thereby decide the increase ratio. The function is expressed by, for example, a polynomial or a fractional expression. FIG. 5 is a diagram showing an example of the function taking Ymax/Bmax as an independent variable, and taking the increase ratio D1 as a dependent variable. It should be noted that it is possible for the decider 111 to decide the increase ratio using a table representing the relationship between the value of Ymax/Bmax and the increase ratio.

The decider 111 decides the increase ratio using Ymax/Bmax as the ratio of the transmittance. Therefore, when, for example, the image in a first frame is different in brightness from, but the same in color as the image in a second frame, the increase ratio of the image in the first frame becomes the same as the increase ratio of the image in the second frame. Therefore, the linearity between the images the same in color is kept. For example, the increase ratio of the image in which the maximum value Rmax of the red transmittance and the maximum value Gmax of the green transmittance are each 70%, and the maximum value Bmax of the blue transmittance is 100% becomes the same as the increase ratio of the image in which the maximum value Rmax of the red transmittance and the maximum value Gmax of the green transmittance are each 35%, and the maximum value Bmax of the blue transmittance is 50%.

When Ymax<Bmax is true, the red pixel values and the green pixel values can always be increased. Therefore, when Ymax<Bmax is true, the decider 111 makes the increase ratio higher than "1." It should be noted that the light controller 112 decides the increase ratio within a range in which the supply current I1 to the blue light provider 1421 is equal to or lower than the rated current, and the red transmittance and the green transmittance are each equal to or lower than 100%.

In contrast, when Ymax≥Bmax is true, there is a possibility that at lease either one of the maximum value of the red pixel values and the maximum value of the green pixel values cannot be increased. For example, when the maximum value Rmax of the red transmittance is 100%, and the maximum value Bmax of the blue transmittance is 95%, the maximum value of the red pixel values cannot be increased.

Therefore, when Ymax≥Bmax is true, the decider 111 fixes the increase ratio to "1."

Figure 6:
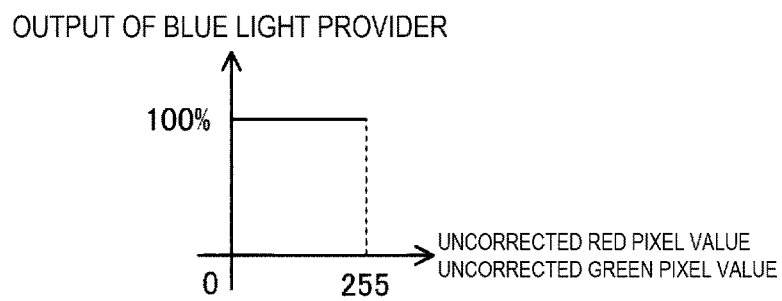
FIG. 6 is a diagram showing a state of blue light BL.
Figure 7:
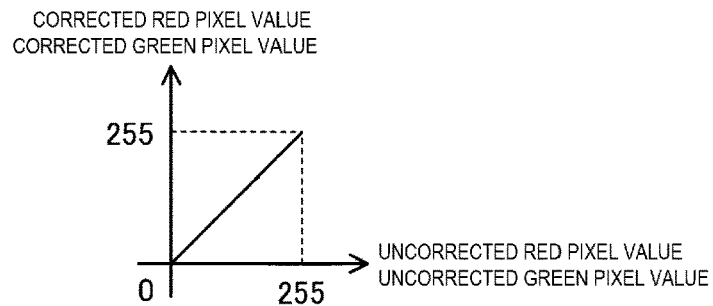
FIG. 7 is a diagram showing a corrected red pixel value and a corrected green pixel value.
Figure 8:
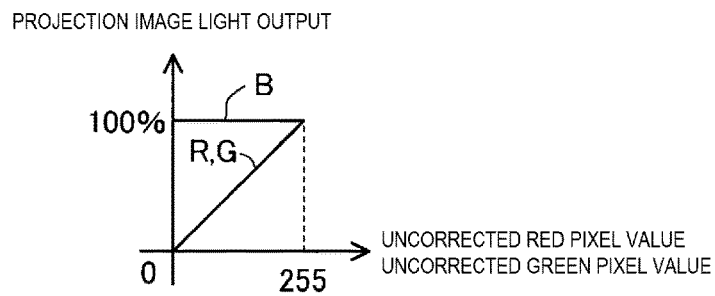
FIG. 8 is a diagram showing a state of projection image light.

Then, an operation example when fixing the blue pixel values to "255," and varying the red pixel values and the green pixel values from "0" through "255" will be described using FIG. 6 through FIG. 8. FIG. 6 is a diagram showing an output state of the blue light provider 1421, namely the state of the blue light BL, when the increase ratio is always "1." FIG. 7 is a diagram showing the corrected red pixel value and the corrected green pixel value when the increase ratio is always "1." FIG. 8 is a diagram showing the state of the projection image light, specifically, the state of the blue image light included in the projection image light, the state of the red image light included in the projection image light, and the state of the green image light included in the projection image light, when the increase ratio is always "1." In FIG. 8, the blue image light included in the projection image light is denoted by "B," the red image light included in the projection image light is denoted by "R," and the green image light included in the projection image light is denoted by "G."

Figure 9:
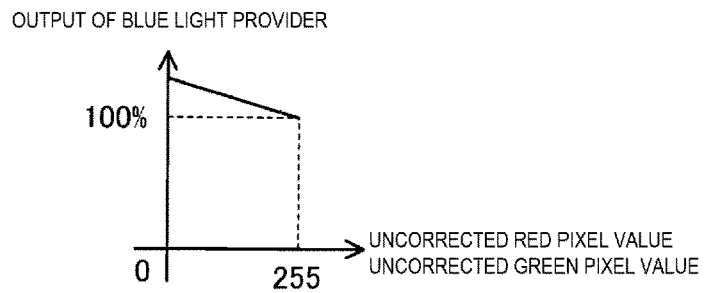
FIG. 9 is a diagram showing a state of the blue light BL.
Figure 10:
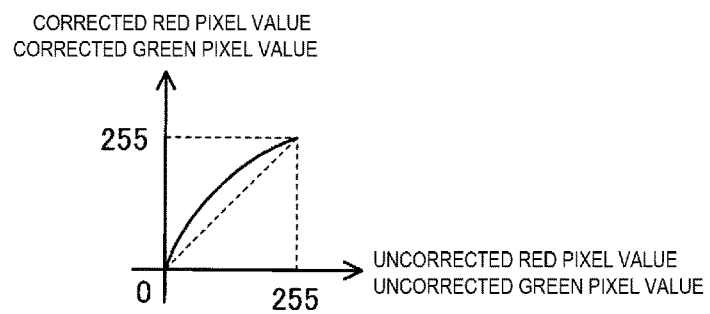
FIG. 10 is a diagram showing the corrected red pixel value and the corrected green pixel value.
Figure 11:
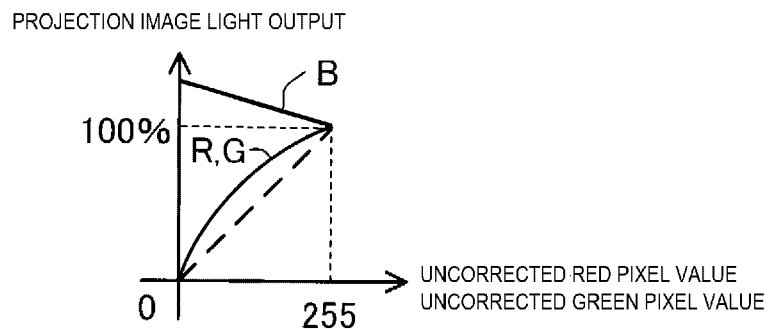
FIG. 11 is a diagram showing a state of the projection image light.

FIG. 9 is a diagram showing an output state of the blue light provider 1421, namely the state of the blue light BL, when the increase ratio is changed. FIG. 10 is a diagram showing the corrected red pixel value and the corrected green pixel value when the increase ratio is changed. FIG. 11 is a diagram showing the state of the projection image light, specifically, the state of the blue image light included in the projection image light, the state of the red image light included in the projection image light, and the state of the green image light included in the projection image light, when the increase ratio is changed. In FIG. 11, the blue image light included in the projection image light is denoted by "B," the red image light included in the projection image light is denoted by "R," and the green image light included in the projection image light is denoted by "G." In FIG. 9 through FIG. 11, how the increase ratio is changed is based on the example shown in FIG. 5. In the example shown in FIG. 9 through FIG. 11, the smaller the red pixel value and the green pixel value are, the higher the degree of increase in the blue image light is.

Figure 12:
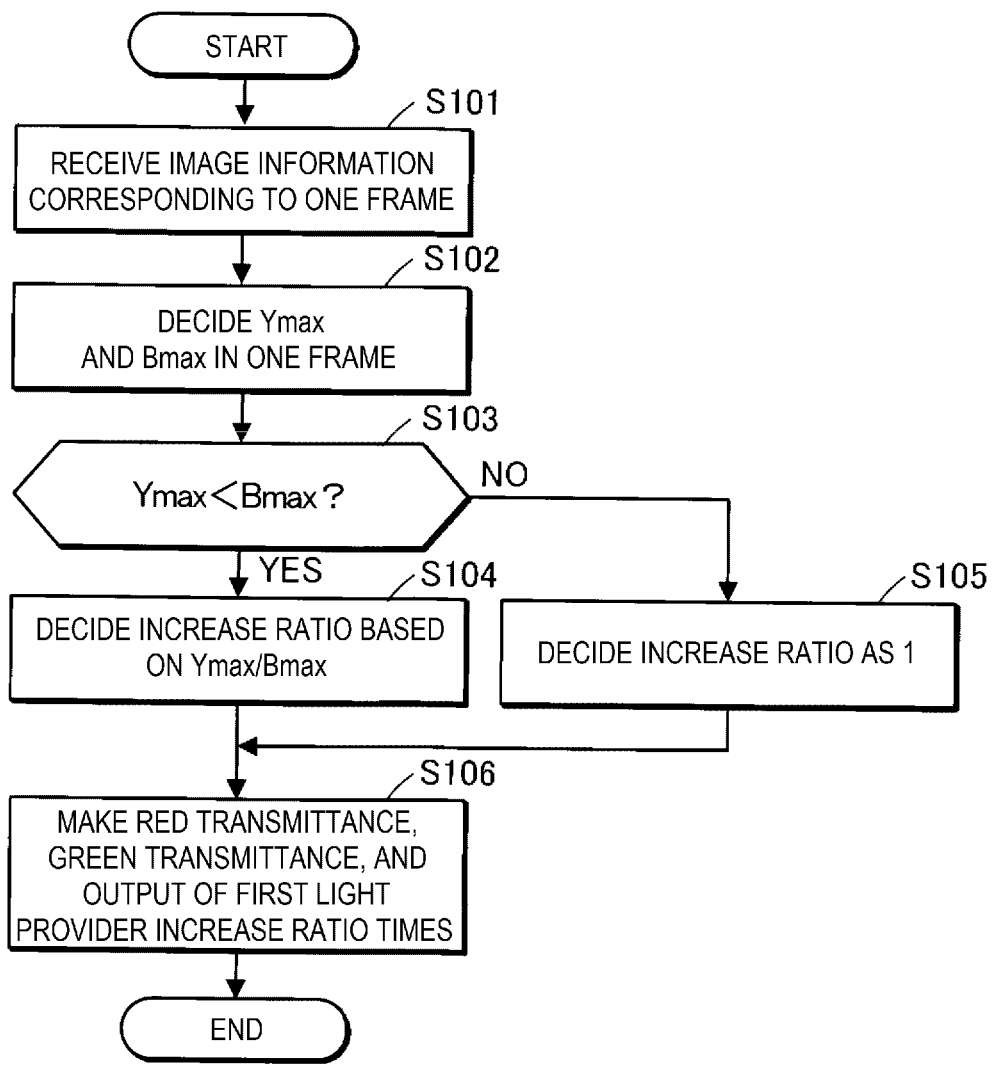
FIG. 12 is a flowchart for explaining an operation.

FIG. 12 is a flowchart for explaining the operation described above. The operation shown in FIG. 12 is repeated in every frame.

In the step S101, the decider 111 receives the image information such as the projection image information corresponding to one frame from the image processor 150.

Subsequently, in the step S102, the decider 111 decides the maximum value Ymax of the red-green transmittance and the maximum value Bmax of the blue transmittance based on the image information corresponding to one frame.

Subsequently, in the step S103, the decider 111 determines whether or not Ymax<Bmax is true.

When Ymax<Bmax is true, the decider 111 decides the increase ratio based on the value of Ymas/Bmax in the step S104. In this case, the increase ratio is a value higher than "1."

In contrast, when Ymax≥Bmax is true, the decider 111 decides the increase ratio as "1" in the step S105.

Subsequently, in the step S106, the light controller 112 corrects the red transmittances corresponding to the image of the one frame, the green transmittances corresponding to the image of the one frame, and the output of the blue light provider 1421 using the increase ratio.

For example, the light controller 112 adjusts the current I1 so that the corrected output of the blue light provider 1421 becomes the output amount obtained by multiplying the uncorrected output of the blue light provider 1421 by the increase ratio. The light controller 112 multiplies the red transmittances corresponding to the image of the one frame by the increase ratio to thereby correct the red transmittances corresponding to the image of the one frame. Then, the light controller 112 corrects the plurality of red pixel values based on the corrected red transmittances. The light controller 112 multiplies the green transmittances corresponding to the image of the one frame by the increase ratio to thereby correct the green transmittances corresponding to the image of the one frame. Then, the light controller 112 corrects the plurality of green pixel values based on the corrected green transmittances.

Subsequently, the light controller 112 supplies the corrected image information including the corrected red pixel values, the corrected green pixel values, and the uncorrected blue pixel values to the image processor 150. The corrected red pixel values represent the image obtained by making the brightness of the image represented by the uncorrected red pixel values the increase ratio times as high as before. The corrected green pixel values represent the image obtained by making the brightness of the image represented by the uncorrected green pixel values the increase ratio times as high as before. The image processor 150 generates the drive signal based on the corrected image information. Specifically, the image processor 150 generates the red drive signal based on the corrected red pixel values, generates the green drive signal based on the corrected green pixel values, and generates the blue drive signal based on the uncorrected blue pixel values. The image processor 150 supplies the red drive signal, the green drive signal, and the blue drive signal to the driver 145.

The driver 1450 generates the red drive voltages based on the red drive signal, generates the green drive voltages based on the green drive signal, and generates the blue drive voltages based on the blue drive signal. The driver 1450 supplies the red drive voltages to the red light modulation device 4R to thereby make the red light modulation device 4R generate the red image light corresponding to the red drive voltages. The driver 1450 supplies the green drive voltages to the green light modulation device 4G to thereby make the green light modulation device 4G generate the green image light corresponding to the green drive voltages. The driver 1450 supplies the blue drive voltages to the blue light modulation device 4B to thereby make the blue light modulation device 4B generate the blue image light corresponding to the blue drive voltages. Therefore, it is possible to make the image represented by the projection image information brighter while keeping the white balance in the image represented by the projection image information.

It should be noted that in the first embodiment, the projector 1000 including the blue light provider 1421 and the yellow light provider 1422 makes use of the available capacity of the blue light provider 1421 to thereby make the projection image brighter.

However, in a projector which has a plurality of light sources, and in which the light sources respectively emit light beams different in color from each other, when the plurality of light sources includes one or more light sources having available capacity, it is also possible to make the projection image brighter while keeping the white balance in the projection image using substantially the same method as in the first embodiment.

For example, in the projector having a red light source for emitting the red light, a green light source for emitting the green light, and a blue light source for emitting the blue light, when the red light source has available capacity, by increasing each of the output of the red light source, the green transmittance, and the blue transmittance, it is possible to make the projection image brighter while keeping the white balance in the projection image. In this case, the red color becomes an example of the first color, the green color becomes an example of the second color, and the blue color becomes an example of the third color. It should be noted that the green color can be an example of the third color. In this case, the blue color becomes an example of the second color. Further, when the green light source has available capacity, by increasing each of the output of the green light source, the blue transmittance, and the red transmittance, it is possible to make the projection image brighter while keeping the white balance in the projection image. In this case, the green color becomes an example of the first color, the blue color becomes an example of the second color, and the red color becomes an example of the third color. It should be noted that the blue color can be an example of the third color. In this case, the red color becomes an example of the second color.

A7: Conclusion of First Embodiment

The method of the operation and the projector 1000 according to the disclosure described above include the following aspects.

The blue light provider 1421 outputs the blue light. The yellow light provider 1422 emits the yellow light including the red light and the green light. The blue light modulation device 4B generates the first output light from the first colored light received out of the blue light pixel by pixel. The red light modulation device 4R generates the second output light from the second colored light received out of the red light pixel by pixel. The green light modulation device 4G generates the third output light from the third colored light received out of the green light pixel by pixel. The projection optical system 1470 uses the first output light, the second output light, and the third output light to thereby project the projection image. The decider 111 decides the increase ratio based on the image information. The light controller 112 controls the light intensity of the blue light, the proportion of the light intensity of the second output light to the light intensity of the second colored light, and the proportion of the light intensity of the third output light to the light intensity of the third colored light based on the amplification information.

According to this aspect, when the blue light provider 1421 has available capacity, it is possible to make the projection image brighter while keeping the white balance in the projection image by making use of the available capacity.

In general, in order to increase the brightness of the projection image, there is involved an increase in component cost caused by an increase of the light sources, adoption of a high-performance optical component, or the like. In contrast, in this aspect, since it is not required to change the physical configuration, it is possible to make the projection image brighter while suppressing the increase in component cost.

In should be noted that in the case described above, the blue color becomes an example of the first color, the red color becomes an example of the second color, and the green color becomes an example of the third color, but the red color can be an example of the third color. In this case, the green color becomes an example of the second color.

The decider 111 identifies the maximum value Bmax of the blue transmittance, the maximum value Rmax of the red transmittance, and the maximum value Gmax of the green transmittance with respect to the image represented by the image information based on the image information. When the maximum value Bmax of the blue transmittance is higher than the maximum value Rmax of the red transmittance and the maximum value Gmax of the green transmittance, the decider 111 decides the gain representing a value greater than 1. According to this aspect, when the blue light provider 1421 has the available capacity, and at the same time, the red transmittance and the green transmittance have allowance, it is possible to make the projection image brighter while keeping the white balance in the projection image.

The decider 111 decides the increase ratio based on the ratio between higher one of the maximum value Rmax of the red transmittance and the maximum value Gmax of the green transmittance, and the maximum value Bmax of blue transmittance. According to this aspect, there increases the possibility that the linearity of the brightness is kept between the images the same in white balance.

The blue light provider 1421 outputs the blue light with the light intensity corresponding to the supply current I1. The light controller 112 adjusts the supply current I1 to thereby adjust the light intensity of the blue light. According to this aspect, it is possible to adjust the light intensity of the blue light with the simple control such as an adjustment of the supply current.

The maximum value Bmax of the blue transmittance is the maximum value of the blue transmittance calculated based on the image information in one frame of image. The maximum value Rmax of the red transmittance is the maximum value of the red transmittance calculated based on the image information in one frame of image. The maximum value Gmax of the green transmittance is the maximum value of the green transmittance calculated based on the image information in one frame of image. According to this aspect, it is possible to decide the increase ratio every frame of image.

B: Modified Examples

Some aspects of the modifications of the embodiment hereinabove illustrated will hereinafter be illustrated. It is also possible to arbitrarily combine two or more aspects arbitrarily selected from the following illustrations with each other within a range in which the aspects do not conflict with each other.

B1: First Modified Example

Figure 13:
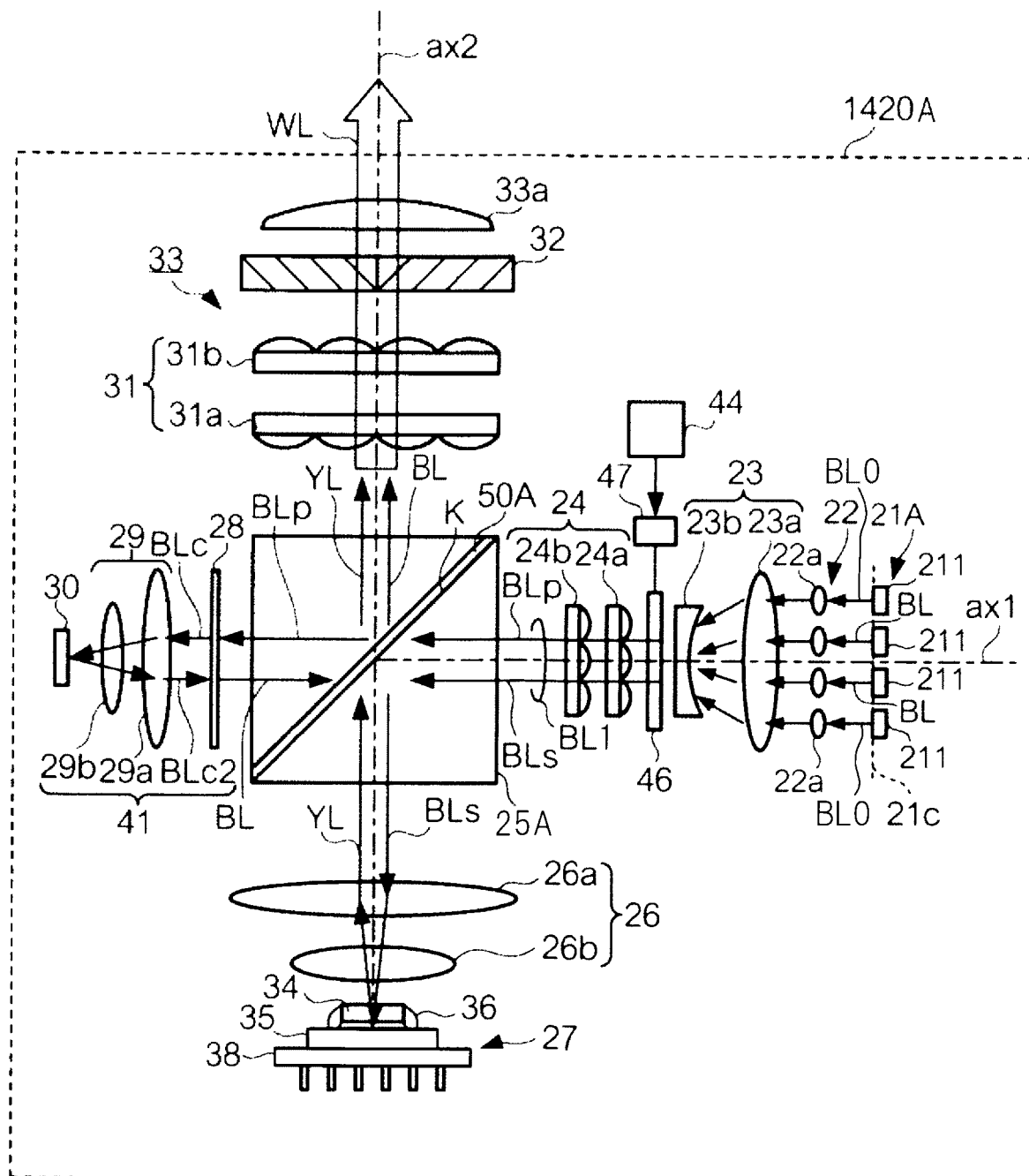
FIG. 13 is a diagram showing an illumination optical system 1420A.

The illumination optical system 1420 is not limited to the configuration illustrated in FIG. 2. FIG. 13 is a diagram showing an illumination optical system 1420A as another example of the illumination optical system 1420.

The illumination optical system 1420A includes an array light source 21A, a collimator optical system 22, an afocal optical system 23, a wave plate 46, a motor 47, a motor controller 44, a homogenizer optical system 24, a prism 25A, a first pickup optical system 26, a light emitting element 27, an optical element 41, a diffusely reflecting element 30, a polarization conversion element 32, and a superimposing optical system 33. The optical element 41 includes a wave plate 28, a second pickup optical system 29, and a diffusely reflecting element 30. The superimposing optical system 33 includes an integrator optical system 31 and a superimposing lens 33a.

The array light source 21A, the collimator optical system 22, the afocal optical system 23, the homogenizer optical system 24, the prism 25A, the wave plate 28, the second pickup optical system 29, and the diffusely reflecting element 30 are arranged in sequence on a light axis ax1 in the state in which the respective optical centers thereof coincide with the light axis ax1.

The light emitting element 27, the first pickup optical system 26, the prism 25A, the integrator optical system 31, the polarization conversion element 32, and the superimposing lens 33a are arranged in sequence on a light axis ax2 in the state in which the respective optical centers thereof coincide with the light axis ax2. The light axis ax1 and the light axis ax2 are located in the same plane, and are perpendicular to each other.

The array light source 21A includes a plurality of semiconductor lasers 211. The plurality of semiconductor lasers 211 is arranged in an array in a plane 21c perpendicular to the light axis ax1. The number of the semiconductor lasers 211 is not particularly limited. The semiconductor lasers 211 are an example of a light source. The semiconductor lasers 211 each emit a blue light beam BL0 as S-polarized light. The blue light beam BL0 as the S-polarized light is an example of fourth light having a polarizing axis. The full width at half maximum of the blue light beam BL0 is equal to or smaller than 30 nm. The full width at half maximum of the blue light beam BL0 can be larger than 30 nm. The blue light beams BL0 are emitted from the array light source 21A toward the collimator optical system 22.

The collimator optical system 22 converts the blue light beams BL0 into parallel light beams. The collimator optical system 22 includes, for example, a plurality of collimator lenses 22a arranged in an array. The collimator lenses 22a correspond respectively to the semiconductor lasers 211.

The blue light beams BL0 are converted into the parallel light beams, and then enter the afocal optical system 23. The afocal optical system 23 adjusts the light flux diameter of the blue light beams BL0. The afocal optical system 23 includes, for example, afocal lenses 23a, 23b.

On the light path between the afocal optical system 23 and the homogenizer optical system 24, there is disposed the wave plate 46. The wave plate 46 is disposed so as to be able to rotate in a plane of incidence of the blue light beams BL0. The wave plate 46 includes a ½ wave plate with respect to the wavelength of the blue light beams BL0. The wave plate 46 has an optical axis. The optical axis of the wave plate 46 crosses the polarizing axis of the blue light beams BL0 entering the wave plate 46. The optical axis of the wave plate 46 can be either one of a fast axis and a slow axis of the wave plate 46. The motor 47 rotates the wave plate 46. The motor controller 44 controls the motor 47 to thereby rotate the wave plate 46.

The blue light beams BL0 are each coherent S-polarized light. Since the polarizing axis of the blue light beams BL0 crosses the optical axis of the wave plate 46, the wave plate 46 converts a part of the blue light beams BL0 as the S-polarized light into blue light as P-polarized light. As a result, the blue light beams BL1 emitted from the wave plate 46 includes an S-polarization component BLs and a P-polarization component BLp. The P-polarization component BLp is the blue light beams BL0 which pass through the wave plate 46 to thereby be changed in direction of the polarizing axis.

The blue light beams BL1 enter the homogenizer optical system 24. The homogenizer optical system 24 converts the light intensity distribution of the blue light beams BL1 into, for example, a uniform light intensity distribution called a top-hat distribution. The homogenizer optical system 24 includes, for example, multi-lens arrays 24a, 24b.

The blue light beams BL1 are emitted from the homogenizer optical system 24, and then enter the prism 25A. The prism 25A includes a dichroic prism having wavelength selectivity. The dichroic prism has a tilted surface K forming an angle of 45° with the light axis ax1. The tilted surface K also forms an angle of 45° with the light axis ax2. The prism 25A is disposed so that the intersection between the light axes ax1, ax2 perpendicular to each other and the optical center of the tilted surface K coincide with each other. It is possible for the prism 25A to include a dichroic mirror shaped like a parallel plate instead of the dichroic prism.

The tilted surface K is provided with a polarization separation element 50A having wavelength selectivity. The polarization separation element 50A splits the blue light beams BL1 into the S-polarization component BLs with respect to the polarization separation element 50A and the P-polarization component BLp with respect to the polarization separation element 50A. The polarization separation element 50A reflects the S-polarization component BLs, and transmits the P-polarization component BLp of the blue light beams BL1. The S-polarization component BLs is reflected by the polarization separation element 50A, and is then used for the excitation of a phosphor layer 34. Therefore, the S-polarization component BLs is referred to as "excitation light BLs." It should be noted that as described later, the phosphor layer 34 is excited to thereby generate the fluorescence YL having a yellow color different in color from the blue light beams BL0. The P-polarization component BLp is used as the illumination light having a blue color. The polarization separation element 50A transmits the fluorescence YL having the yellow color irrespective of the polarization state of the fluorescence YL.

The excitation light BLs enters the first pickup optical system 26. The first pickup optical system 26 converges the excitation light BLs toward the light emitting element 27. The first pickup optical system 26 includes, for example, pickup lenses 26a, 26b.

The excitation light BLs is emitted from the first pickup optical system 26, and then enters the light emitting element 27. The light emitting element 27 includes the phosphor layer 34, a substrate 35, an adhesive 36, and a heatsink 38. The phosphor layer 34 includes a phosphor. The phosphor layer 34 is fixed to the substrate 35 with the adhesive 36. In the substrate 35, to a surface opposite to a surface where the phosphor layer 34 is located, there is provided the heatsink 38. The heatsink 38 releases the heat of the phosphor layer 34. The excitation light BLs enters the phosphor layer 34. When the excitation light BLs enters the phosphor layer 34, the phosphor included in the phosphor layer 34 is excited. Therefore, the fluorescence YL having the yellow color different in wavelength from the excitation light BLs is generated.

The fluorescence YL is unpolarized light non-uniform in polarization direction. The fluorescence YL passes through the first pickup optical system 26, and then enters the polarization separation element 50A while keeping the state of the unpolarized light. The fluorescence YL is transmitted through the polarization separation element 50A. The fluorescence YL is transmitted through the polarization separation element 50A, and then proceeds toward the integrator optical system 31.

Meanwhile, the P-polarization component BLp is transmitted through the polarization separation element 50A, and then enters the wave plate 28. The wave plate 28 is disposed in the light path between the polarization separation element 50A and the diffusely reflecting element 30. The wave plate 28 includes a ¼ wave plate with respect to the wavelength of the P-polarization component BLp. The wave plate 28 converts the P-polarization component BLp into blue light BLc as circularly polarized light BLc. The blue light BLc as the circularly polarized light enters the second pickup optical system 29.

The second pickup optical system 29 converges the blue light BLc as the circularly polarized light toward the diffusely reflecting element 30. The second pickup optical system 29 includes pickup lenses 29a, 29b.

The diffusely reflecting element 30 reflects the blue light BLc as the circularly polarized light toward the polarization separation element 50A with diffuse reflection. It is preferable for the diffusely reflecting element 30 to reflect the blue light BLc as the circularly polarized light with the Lambertian reflection. In the illumination optical system 1420, when the diffusely reflecting element 30 of this kind is used, the blue light BLc as the circularly polarized light is reflected with the diffuse reflection, and at the same time, the illuminance distribution becomes homogenous in blue light BLc2 as circularly polarized light which is reflected light of the blue light BLc as the circularly polarized light.

The blue light BLc2 as the circularly polarized light enters the wave plate 28 once again. The wave plate 28 converts the blue light BLc2 as the circularly polarized light into the blue light BL as the S-polarized light. The blue light BL as the S-polarized light is an example of the first light. Furthermore, the blue light BL as the S-polarized light is generated from the blue light beams BL0 which pass through the wave plate 46 to thereby be changed in direction of the polarizing axis. The blue light BL as the S-polarized light enters the polarization separation element 50A. The polarization separation element 50A reflects the blue light BL as the S-polarized light toward the integrator optical system 31.

The blue light BL as the S-polarized light is used as the illumination light WL together with the fluorescence YL having been transmitted through the polarization separation element 50A. In other words, the blue light BL as the S-polarized light and the fluorescence YL are emitted from the polarization separation element 50A toward the same direction. Therefore, the blue light BL as the S-polarized light and the fluorescence YL having a yellow color are combined with each other. As a result, the illumination light WL having a white color is obtained. The polarization separation element 50A also functions as a color combining element for combining the blue light BL as the S-polarized light and the fluorescence YL with each other.

The illumination light WL is emitted from the polarization separation element 50, and then enters the integrator optical system 31. The integrator optical system 31 divides the illumination light WL into a plurality of small light beams. The integrator optical system 31 includes a first lens array 31a and a second lens array 31b. In each of the first lens array 31a and the second lens array 31b, a plurality of microlenses is arranged in an array.

The illumination light WL is emitted from the integrator optical system 31, and then enters the polarization conversion element 32. The polarization conversion element 32 uniforms the polarization direction of the illumination light WL. The polarization conversion element 32 includes, for example, a polarization separation film, a wave plate, and a mirror. The polarization conversion element 32 uniforms the polarization direction of the fluorescence YL as unpolarized light and the polarization direction of the blue light BL as the S-polarized light with each other. Specifically, the polarization conversion element 32 converts one polarization component into the other polarization component, for example, converts the P-polarization component into the S-polarization component.

After the polarization direction of the illumination light WL is uniformed, the illumination light WL enters the superimposing lens 33a. The superimposing lens 33a superimposes the small light beams forming the illumination light WL on each other on the illumination object. Therefore, the illumination light WL is emitted from the superimposing lens 33a, and then uniformly illuminates the illumination object.

The light controller 112 makes the motor controller 44 adjust the angle formed between the optical axis of the wave plate 46 and the polarizing axis of the blue light beams BL0 as the S-polarized light based on the increase ratio to thereby control the output of the blue light BL as the S-polarized light from the illumination optical system 1420A. It should be noted that the illumination optical system 1420A acts as all of the first light provider, the second light provider, and the third light provider.

When Ymax<Bmax is true, it is possible for the light controller 112 to increase the brightness of the projection image while keeping the white balance in the projection image by rotating the wave plate 46 so that the light intensity of the blue light BL as the S-polarized light increases, and at the same time, increasing the red transmittance and the green transmittance.

Here, when rotating the wave plate 46 so that the light intensity of the blue light BL as the S-polarized light increases, namely when rotating the wave plate 46 so that the light intensity of the P-polarization component BLp increases, the light intensity of the S-polarization component BLs decreases. When the light intensity of the S-polarization component BLs decreases, the light intensity of the fluorescence YL decreases. Therefore, it is necessary to increase the red transmittance and the green transmittance so as to compensate the decrease in light intensity of the fluorescence YL.

As a specific example, there is described a second situation. The second situation is as follows. The maximum value in the plurality of red pixel values is "217." The maximum value in the plurality of green pixel values is "217." The maximum value in the plurality of blue pixel values is "255."

In this case, the decider 111 identifies "70%" as the maximum value of the red transmittance based on the maximum value "217" of the red pixel values. The decider 111 identifies "70%" as the maximum value of the green transmittance based on the maximum value "217" of the green pixel values. The decider 111 identifies "100%" as the maximum value of the blue transmittance based on the maximum value "255" of the blue pixel values.

Here, it is assumed that the decider 111 decides "1.1" as the increase ratio of the blue light due to the rotation of the wave plate 46. Further, it is assumed that the decider 111 decides "0.98" as the increase ratio of the fluorescence due to the rotation of the wave plate 46. It should be noted that the relationship between the increase ratio of the blue light due to the rotation of the wave plate 46 and the increase ratio of the fluorescence due to the rotation of the wave plate 46 results from the characteristics of the illumination optical system 1420A such as operation characteristics of the phosphor layer 34.

In this case, the output of the fluorescence YL is changed to 100%*0.98=98%. The value "0.98" is a value of the increase ratio of the fluorescence due to the rotation of the wave plate 46. The output of the blue light is changed to 100%*1.1=110%. The value "1.1" is a value of the increase ratio of the blue light due to the rotation of the wave plate 46. The light controller 112 makes the transmittance of each of the pixels of the red light modulation device 4R 1.1/0.98 times as high as before. For example, the light controller 112 changes the maximum value of 70% of the red transmittance to 70%*1.1/0.98=79%. The light controller 112 makes the transmittance of each of the pixels of the green light modulation device 4G 1.1/0.98 times as high as before. For example, the light controller 112 changes the maximum value of 70% of the green transmittance to 70%*1.1/0.98=79%. The light controller 112 does not change the transmittance of each of the pixels of the blue light modulation device 4B. For example, the light controller 112 keeps the maximum value of 100% of the blue transmittance.

Since the output of the fluorescence YL is set to 98%, and the transmittance of each of the pixels of the red light modulation device 4R is made 1.1/0.98 times as high as before, the light intensity of the red image light included in the projection image light becomes 1.1 times as high as before. Since the output of the fluorescence YL is set to 98%, and the transmittance of each of the pixels of the green light modulation device 4G is made 1.1/0.98 times as high as before, the light intensity of the green image light included in the projection image light becomes 1.1 times as high as before. Since the output of the blue light is made 1.1 times as high as before, the light intensity of the blue image light included in the projection image light becomes 1.1 times as high as before. Therefore, it is possible to increase the brightness of the projection image light while keeping the white balance.

Figure 14:
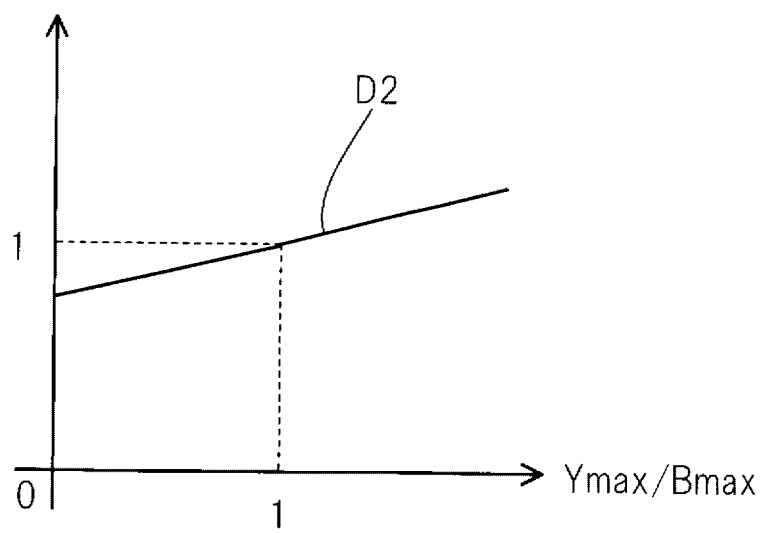
FIG. 14 is a diagram showing an increase ratio of yellow light.
Figure 15:
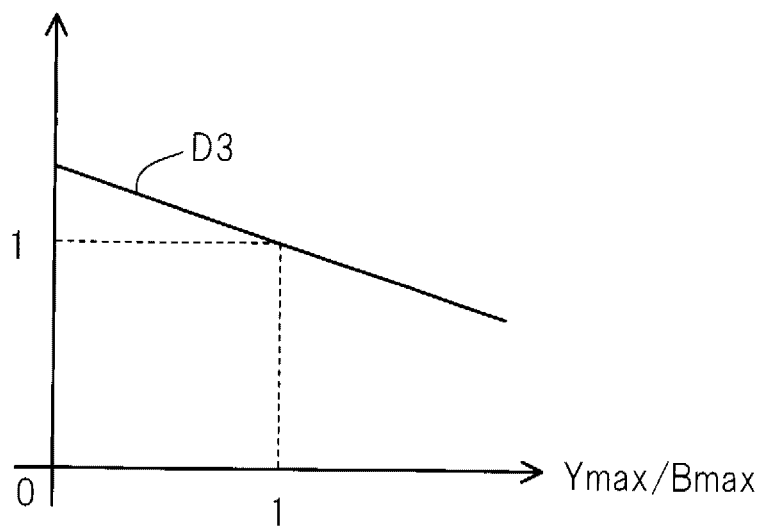
FIG. 15 is a diagram showing an increase ratio of blue light.

In this configuration, when Ymax>Bmax is true, it is possible to increase the brightness of the projection image while keeping the white balance in the projection image by rotating the wave plate 46 so that the light intensity of the fluorescence YL increases, and at the same time, increasing the blue transmittance. Therefore, the increase ratio D2 of the yellow light becomes, for example, as shown in FIG. 14, and the increase ratio D3 of the blue light becomes, for example, as shown in FIG. 15. Therefore, when Ymas is different from Bmax, it is possible to increase the brightness of the projection image.

B2: Second Modified Example

Figure 16:
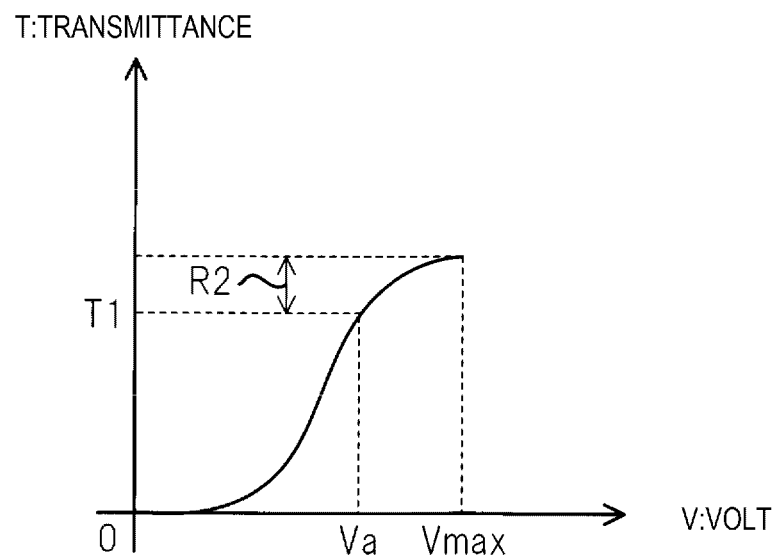
FIG. 16 is a diagram showing an example of a VT curve.

In the first embodiment and the first modified example, the available capacity in the light source is utilized. In contrast, in the second modified example, when the red transmittance, the green transmittance, or the blue transmittance has available capacity, by increasing the transmittance having the available capacity, the brightness of the projection image is increased. Here, when the transmittance has the available capacity means when a voltage Va lower then the maximum voltage Vmax in the VT curve, namely the voltage-transmittance curve, is used when the pixel value represented by the image information is the largest as shown in FIG. 16. It should be noted that the maximum voltage Vmax is the voltage for making the transmittance the highest.

As an example, there is described when the red transmittance corresponding to the maximum red pixel value is 90%, the green transmittance corresponding to the maximum green pixel value is 100%, and the blue transmittance corresponding to the maximum blue pixel value is 80%. In this case, since the green transmittance corresponding to the maximum green pixel value is 100%, it is unachievable to increase the green transmittance while keeping the linearity. In contrast, since the red transmittance corresponding to the maximum red pixel value and the blue transmittance corresponding to the maximum blue pixel value are lower than 100%, there is room for increasing the transmittance. In other words, the red transmittance and the blue transmittance each have the available capacity. Therefore, the requirement to make it possible to increase the brightness of the projection image is to fulfill both of Gmax<Rmax and Gmax<Bmax. In other words, when this requirement is fulfilled, Gmax is always lower than 100%, and the allowance occurs in the green transmittance. When this requirement is fulfilled, it is possible for the light controller 112 to increase the brightness of the projection image while keeping the white balance in the projection image by increasing the red transmittance and the blue transmittance, and then increasing the green transmittance in accordance with the increase in the red transmittance and the blue transmittance.

Figure 17:
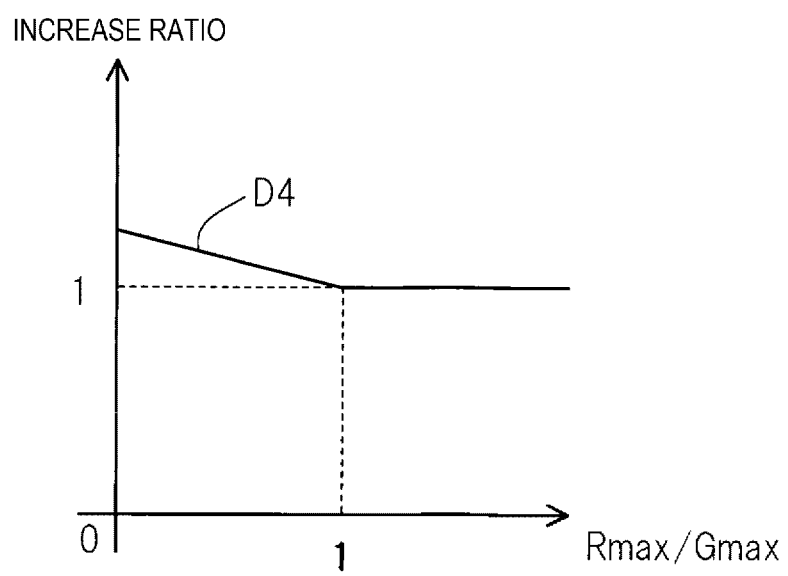
FIG. 17 is a diagram showing an example of an increase ratio.
Figure 18:
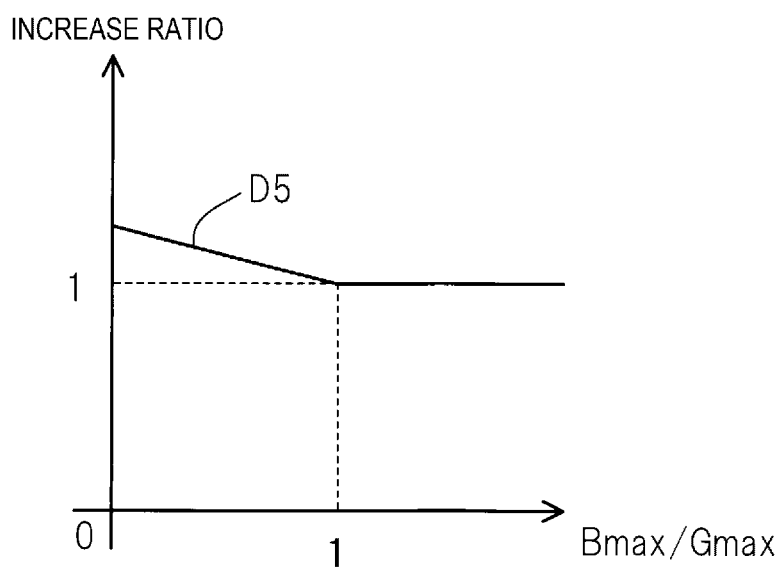
FIG. 18 is a diagram showing an example of the increase ratio.

The decider 111 decides the increase ratio so that all of the red transmittance, the green transmittance, and the blue transmittance become lower than 100%. Therefore, the decider 111 decides the increase ratio based on the ratio between a value of higher one of Rmax and Bmax, and Gmax. When Rmax≥Bmax is true, the decider 111 decides the increase ratio D4 as shown in FIG. 17 based on the value of Rmax/Gmax. When Rmax<Bmax is true, the decider 111 decides the increase ratio D5 as shown in FIG. 18 based on the value of Rmax/Gmax. When Rmax≥Bmax is true, when the decider 111 decides the increase ratio D4 so that Rmax does not exceed 100%, there is logically no chance for Bmax to exceed 100%. When Rmax<Bmax is true, when the decider 111 decides the increase ratio D5 so that Bmax does not exceed 100%, there is logically no chance for Rmax to exceed 100%.

In the second modified example, when Gmax is lower than Bmax and Rmax, the light controller 112 operates as follows.

The light controller 112 makes the blue light modulation device 4B generate the first output light from the first colored light based on the image information representing the image obtained by making the brightness of the image represented by the plurality of uncorrected blue pixel values the increase ratio times as high as before, namely based on the plurality of corrected blue pixel values. Further, the light controller 112 makes the red light modulation device 4R generate the second output light from the second colored light based on the image information representing the image obtained by making the brightness of the image represented by the plurality of uncorrected red pixel values the increase ratio times as high as before, namely based on the plurality of corrected red pixel values. Further, the light controller 112 makes the green light modulation device 4G generate the third output light from the third colored light based on the image information representing the image obtained by making the brightness of the image represented by the plurality of uncorrected green pixel values the increase ratio times as high as before, namely based on the plurality of corrected green pixel values. According to this aspect, by making use of the transmittance having the available capacity, it is possible to increase the brightness of the projection image while keeping the white balance in the projection image.

B3: Third Modified Example

In the first embodiment and the first through second modified examples, each of the red light modulation device 4R, the green light modulation device 4G, and the blue light modulation device 4B can be a reflective liquid crystal panel. In this case, in the second modified example, when the reflectance of the reflective liquid crystal panel has allowance, by making use of the reflectance having the allowance, it is possible to increase the brightness of the projection image while keeping the white balance in the projection image.

B4: Fourth Modified Example

In the first embodiment and the first through second modified examples, each of the red light modulation device 4R, the green light modulation device 4G, and the blue light modulation device 4B can be a DMD (Digital Mirror Device). In this case, in the second modified example, when the reflecting time by the DMD has allowance, by making use of the reflecting time having the allowance, it is possible to increase the brightness of the projection image while keeping the white balance in the projection image.

B5: Fifth Modified Example

In the first embodiment and the first through fourth modified examples, the light controller 112 decides the increase ratio based on Rmax, Gmax, and Bmax. In this case, when there is a small bright point having the size as large as several pixels in the projection image, Rmax, Gmax, and Bmax are decided based on that bright point. Therefore, the increase ratio fails to rise to hinder the increase in brightness of the projection image. Therefore, when the change in white balance in the bright point can be allowed to some extent, it is possible for the decider 111 to decide the increase ratio with the influence of the bright point suppressed.

For example, the decider 111 first forms such a frequency distribution as illustrated in FIG. 19 for each of the red pixel values, the green pixel values, and the blue pixel values included in one frame of image. Subsequently, when a class where some of the total number of pixel values, for example, no higher than 0.2% of the total number of pixel values exist is distant as much as a plurality of classes from a class group where the rest of the pixel values exist in the frequency distribution of each color, the decider 111 regards the some of the total number of pixel values as the bright point. It is possible for the decider 111 to use an average value as another method of identifying the bright point. Specifically, the decider 111 first calculates the average value of the pixel values for each color with respect to the red pixel values, the green pixel values, and the blue pixel values included in one frame of image. Subsequently, the decider 111 regards the pixel values a predetermined value or more higher than the average value as the pixel values representing the bright point for each color.

Subsequently, the decider 111 identifies the maximum value of the pixel values excluding the pixel values representing the bright point for each color. In this case, the range including the blue transmittances except the blue transmittances corresponding to the blue pixel values of the bright point becomes an example of a first range. The range including the red transmittances except the red transmittances corresponding to the red pixel values of the bright point becomes an example of a second range. The range including the green transmittances except the green transmittances corresponding to the green pixel values of the bright point becomes an example of a third range. It should be noted that it is possible for the decider 111 to multiply the pixel values of the bright point by an adjustment factor no smaller than 0 and smaller than 1 to thereby decrease the pixel values of the bright point, and then identify the maximum value for each color with respect to the red pixel values, the green pixel values, and the blue pixel values included in one frame of image.

According to this aspect, it is possible to suppress the influence of the relatively high pixel values in one frame of image, and it is possible to make the projection image much brighter.

B6: Sixth Modified Example

In such a configuration of deciding the increase ratio pixel by pixel in one frame as in the first embodiment and the first through fifth modified examples, there is a possibility that the increase ratio dramatically changes in a short time in accordance with a change of the image. In this case, since the brightness of the projection image dramatically varies, there is a possibility that a flicker occurs.

Figure 20:
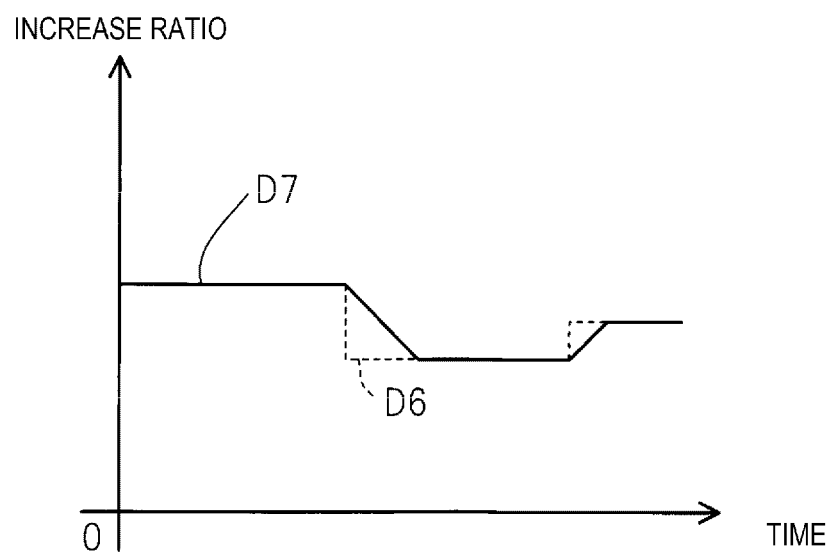
FIG. 20 is a diagram showing an example of the increase ratio.

As a countermeasure for the flicker, when the decider 111 updates the increase ratio, the decider 111 decides the updated increase ratio based on the increase ratio to be updated. Furthermore, the decider 111 decides the updated increase ratio so that the difference between the increase ratio to be updated and the updated increase ratio falls within a predetermined range. In other words, the light controller 112 sets a limitation in the variation of the increase ratio per unit time. In FIG. 20, the increase ratio D6 is an example of the updated increase ratio decided without regard to the increase ratio to be updated. In contrast, the increase ratio D7 is an example of the updated increase ratio decided based on the increase ratio to be updated. According to this aspect, since the change in the increase ratio can be made smooth, it is possible to increase the brightness of the projection image while preventing the flicker in the projection image and the disruption of the white balance in the projection image.

What is claimed is:
1. A method of an operation of a projector,
the projector including
   a first light provider configured to output first light having a first color,
   a second light provider configured to output second light having a second color,
   a third light provider configured to output third light having a third color,
   a first generator configured to generate first output light from the first light,
   a second generator configured to generate second output light from the second light,
   a third generator configured to generate third output light from the third light, and
   a projection optical system configured to project a projection image using the first output light, the second output light, and the third output light,
the method comprising:
   determining, based on image information representing a first image, amplification information representing a degree of amplification of brightness in the first image; and
   controlling, based on the amplification information,
      a proportion of light intensity of the second output light to light intensity of the second light received by the second generator, and a proportion of light intensity of the third output light to light intensity of the third light received by the third generator.

2. The method of the operation of the projector according to claim 1, further comprising:
controlling light intensity of the first light based on the amplification information.

3. The method of the operation of the projector according to claim 2, wherein
the first light provider includes
a wave plate having an optical axis, and
a light source configured to output fourth light having a polarizing axis and having the first color,
the first light is generated from the fourth light which passes through the wave plate to thereby be changed in a direction of the polarizing axis, and
the light intensity of the first light is controlled by adjusting an angle formed between the optical axis and the polarizing axis based on the amplification information.

4. The method of the operation of the projector according to claim 2, wherein
the first light provider outputs the first light with the light intensity corresponding to a current supplied, and
the light intensity of the first light is controlled by adjusting the current based on the amplification information.

5. The method of the operation of the projector according to claim 1, further comprising:
controlling a proportion of light intensity of the first output light to light intensity of the first light received by the first generator based on the amplification information.

6. The method of the operation of the projector according to claim 1, wherein
the amplification information being a ratio of brightness of the projection image to brightness of the first image,
the method further comprising:
determining, based on the image information, with respect to the first image,
a first value of a proportion of light intensity of the first output light to light intensity of the first light received by the first generator,
a second value of the proportion of the light intensity of the second output light, and
a third value of the proportion of the light intensity of the third output light; and
determining the ratio in the brightness based on the first value, the second value, and the third value.

7. The method of the operation of the projector according to claim 6, wherein
when the first value is larger than the second value and the third value, the ratio in brightness is higher than 1.

8. The method of the operation of the projector according to claim 7, wherein
Determining the amplification information based on a ratio between larger one of the second value and the third value, and the first value.

9. The method of the operation of the projector according to claim 6, wherein
the first value is a maximum value of the proportion of the light intensity of the first output light in one frame of image,
the second value is a maximum value of the proportion of the light intensity of the second output light in the one frame of image, and
the third value is a maximum value of the proportion of the light intensity of the third output light in the one frame of image.

10. The method of the operation of the projector according to claim 6, wherein
the first value is a maximum value of a proportion included in a first range out of the proportion of the light intensity of the first output light in one frame of image,
the second value is a maximum value of a proportion included in a second range out of the proportion of the light intensity of the second output light in the one frame of image, and
the third value is a maximum value of a proportion included in a third range out of the proportion of the light intensity of the third output light in the one frame of image.

11. The method of the operation of the projector according to claim 1, further comprising:
when updating the amplification information, determining the amplification information after update based on the amplification information before update.

12. A projector comprising:
a first light provider configured to output first light having a first color;
a second light provider configured to output second light having a second color;
a third light provider configured to output third light having a third color;
a first generator configured to generate first output light from the first light;
a second generator configured to generate second output light from the second light;
a third generator configured to generate third output light from the third light;
a projection optical system configured to project a projection image using the first output light, the second output light, and the third output light; and
at least one processor configured to
determining, based on image information representing a first image, amplification information representing a degree of amplification of brightness of the first image, and
controlling, based on the amplification information,
a proportion of light intensity of the second output light to light intensity of the second light received by the second generator, and
a proportion of light intensity of the third output light to light intensity of the third light received by the third generator.

13. A projector comprising:
a blue light provider configured to output blue light;
a red light provider configured to output red light;
a green light provider configured to output green light;
a blue light modulation device configured to generate first output light from the blue light;
a red light modulation device configured to generate second output light from the red light;
a green light modulation device configured to generate third output light from the green light;

a projection optical system configured to project a projection image using the first output light, the second output light, and the third output light; and at least one processor configured to
- determining, based on image information representing a first image, amplification information representing a degree of amplification of brightness of the first image, and
- controlling, based on the amplification information,
  - transmittance of a pixel of the red light modulation device, and
  - transmittance of a pixel of the green light modulation device.

* * * * *